United States Patent [19]

Ghandhi

[11] Patent Number: 5,792,940
[45] Date of Patent: Aug. 11, 1998

[54] RAPID EVALUATION OF THIN-FILM BARRIER COATINGS ON THICK SUBSTRATES VIA TRANSIENT RESPONSE MEASUREMENTS

[75] Inventor: Jamshed B. Ghandhi, Carrboro, N.C.

[73] Assignee: Becton, Dickinson and Company, Franklin Lakes, N.J.

[21] Appl. No.: 724,516

[22] Filed: Sep. 30, 1996

[51] Int. Cl.$^6$ .................................................. G01N 15/08
[52] U.S. Cl. .................................................. 73/40; 73/38
[58] Field of Search .................................... 73/38, 40

[56] References Cited

U.S. PATENT DOCUMENTS

| | | | |
|---|---|---|---|
| 3,921,436 | 11/1975 | Plegat | 73/40 |
| 4,670,847 | 6/1987 | Furuse | 73/49.2 X |
| 4,675,834 | 6/1987 | Furuse | 73/49.2 X |
| 4,686,638 | 8/1987 | Furuse | 73/49.2 X |
| 4,811,252 | 3/1989 | Furuse | 73/40 X |
| 5,600,996 | 2/1997 | Witschi | 73/40 X |

FOREIGN PATENT DOCUMENTS

| | | | |
|---|---|---|---|
| 6-11408 | 1/1994 | Japan | 73/40 |
| 6-288856 | 10/1994 | Japan | 73/40 |
| 1305546 | 4/1987 | U.S.S.R. | 73/40 |
| 1770837 | 10/1992 | U.S.S.R. | 73/38 |

*Primary Examiner*—Hezron E. Williams
*Assistant Examiner*—Daniel S. Larkin
*Attorney, Agent, or Firm*—Bruce S. Weintraub

[57] ABSTRACT

The present invention is directed to a method for measuring the shelf life of vacuum actuated tubes for blood sample collection, wherein the method comprises placing a collection tube in an apparatus having a first and a second sealable chamber, pressurizing the apparatus to a value above ambient pressure, and sealing both chambers such that each chamber has an identical pressure and is isolated from the other chamber. Leakage of gas into the collection tube located in the first chamber is detected as a differential pressure change relative to the second chamber. This change in pressure is recorded and is indicative of the rate of gas transport into the collection tube.

11 Claims, 8 Drawing Sheets

FIG-7 CONTROL TUBE AND LW BARRIER TUBE 10 TORR SENSOR

RAPID EVALUATION OF THIN-FILM BARRIER COATINGS ON THICK SUBSTRATES VIA TRANSIENT RESPONSE MEASUREMENTS

FIELD OF THE INVENTION

This invention relates to blood collection and, more particularly, relates to vacuum actuated tubes for blood sample collection and a method and apparatus for the measurement of shelf life of these tubes in a rapid manner.

BACKGROUND OF THE INVENTION

Blood samples are routinely taken in evacuated tubes, such as glass or plastic VACUTAINER® tubes (Becton Dickinson and Company) The patient end of a double ended needle is inserted into a patient's vein. The non-patient end of the same needle then punctures the septum of the stopper end of a blood collection tube. The elevated pressure of the patient's blood, relative to the evacuated tube, forces blood through the needle into the tube until the pressure in the tube equals the pressure in the patient's vein. Using this technique, a plurality of samples in separate tubes can be taken using a single needle puncture of the skin.

The exact volume of blood drawn by a device varies, depending upon ambient atmospheric conditions and the storage conditions of the tube up to the time of use. Industry standards specify a + or −10% allowable variation from the labeled draw volume at standard atmospheric conditions. Volumetric accuracy is required for precise control of analytical chemical reactions performed in the tube on freshly drawn samples. Shelf life ratings in excess of two years are acceptable for evacuated blood collection tubes.

To experimentally verify the shelf life of blood collection tubes in less than two years, an "Accelerated Aging" process is conventionally used. By elevating the storage temperature and pressure of the blood collection tubes, the aging process is accentuated. Based on calibration experiments or side by side comparison with control tube results, an estimate of the shelf life of a tube stored at room temperature and pressure can be made based on the results of measurement made under these accelerated aging conditions.

To make the shelf life measurement above, the required number of tubes (30 "test" tubes and 30 control tubes for example) are evacuated and placed in a pressurized cannister (typically 3 atm absolute) within an oven at elevated temperature (40° C. for example). At specified time points, 5–10 days apart, a representative sample of the "test" tubes and control tubes, usually 5 of each, are removed from the chamber. Each individual tube is weighed before and after it is filled with water. The mass of water drawn into each tube is recorded by the operator.

The data from each time point are analyzed to make the shelf-life predictions. This Accelerated Aging Method is a destructive test consuming typically 60 tubes and requiring 45–90 days to complete. Due to variations in reading at each time point, the greater the shelf-life of a tube under test, the more time points are required to satisfactorily complete this measurement to a statistically significant result.

Therefore, there is a need in the art of blood collection for an expedient method, i.e., faster than 45–90 days, to evaluate the shelf life of evacuated blood collection tubes and, in particular, the shelf life of barrier coated thermoplastic blood collection tubes.

SUMMARY OF THE INVENTION

The present invention relates to a rapid method for estimating the shelf life of evacuated blood collection tubes and an apparatus for carrying out this method.

DETAILED DESCRIPTION OF THE INVENTION

Figure 1:
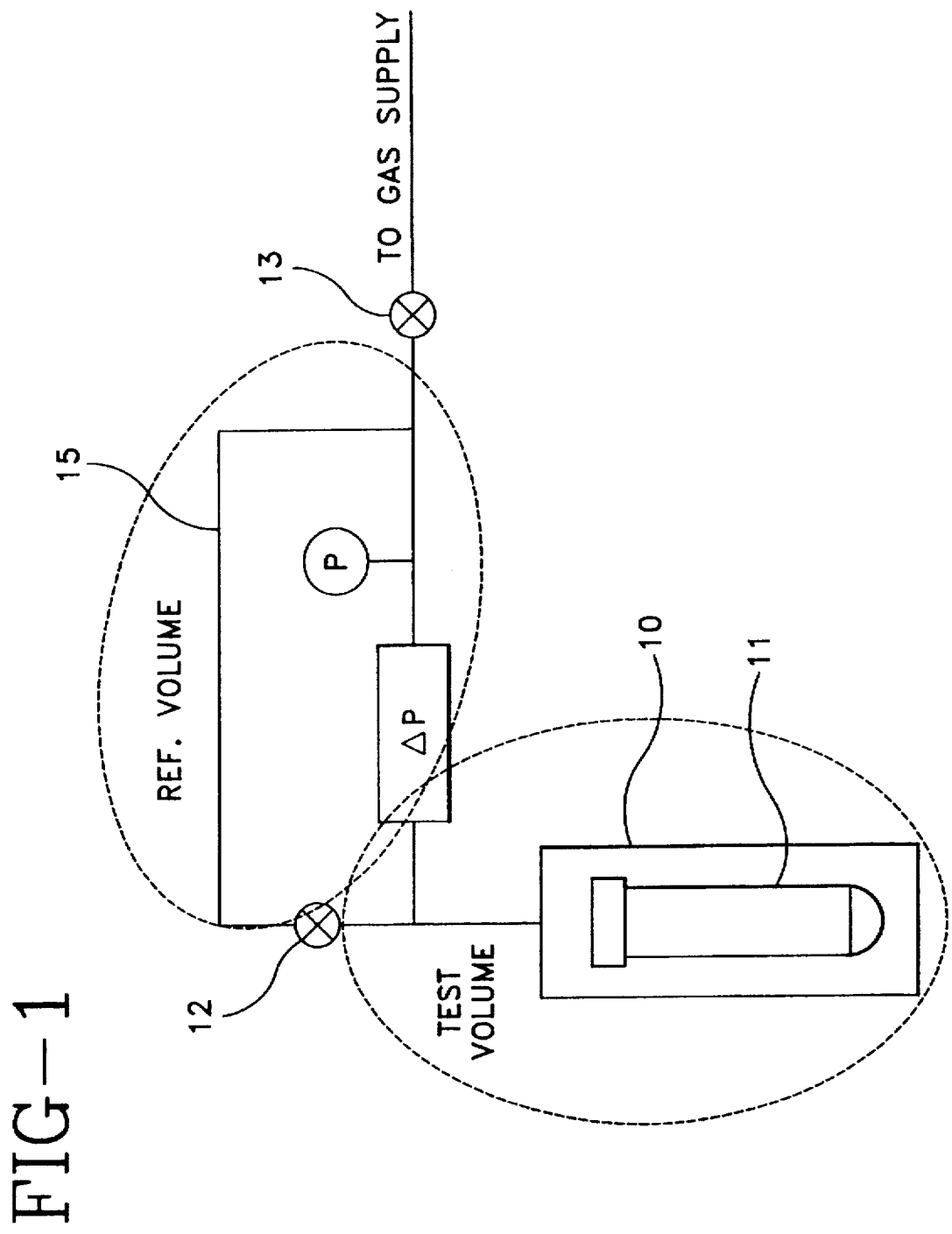
FIG. 1 illustrates an embodiment of the apparatus of the present invention.

The present invention is directed to a method for estimating the shelf life of evacuated blood collection tubes, and also relates to an apparatus whereby the transport of gas into an evacuated blood collection tube can accurately be measured along with physical interpretation of the results for the estimation of shelf life.

The measurement can be performed with an apparatus which includes two sealable measurement chambers 10 and 15 interconnected by a first valve and a differential pressure transducer. In one embodiment, this apparatus is set forth in FIG. 1. After placing a sample tube 11 in the measurement chamber 10, the system is pressurized to some value above ambient pressure. The rapid elevation in external pressure causes permeation across the tube wall to begin. The first valve 12 and a second valve 13 are sealed resulting in two chambers at almost identical pressures isolated from one another. From this point forward, any leakage of gas into the test article from the measurement chamber 10 is detected as a differential pressure change relative to the reference chamber 15 and recorded. The reference chamber 15 stays empty and leak-free. The rate of change of this pressure is directly proportional to the rate of gas transport into the test sample. The pressure history is recorded by a computer and stored in a file for post processing. For thermoplastic blood collection tubes, the gas transport rate can be quantified in days, such as, for example, 10 to 12 days at 25° C.

A second aspect of this invention is the nondestructive nature of the test. The measurement in this apparatus requires elevating the external pressure surrounding a tube. As long as this change does not mechanically damage the device, it can be subsequently subjected to the traditional accelerated aging process and tested destructively for fill volume. The traditional result can then be used as a calibration method for the system.

In the conventional test, many tubes are required, usually 60 or more, as discussed above. Each tube is eventually filled with water to measure the draw volume. In the proposed test, 1 tube is monitored for the entire test. When the test is complete, one can still use the tube for further testing or can perform the destructive fill test if so desired.

A third aspect of this invention is the ability to evaluate externally barrier coated tubes at very early time points, for example, as short a time as 4 days. Thus, non-barrier tubes take 10 days to evaluate while barrier tubes can take as short as 4 days. This is possible because the transient response of the barrier film is much shorter than the transient response of the thick polymer substrate (i.e., the tube wall itself). The external barrier coated tubes are evaluated by utilizing the pressure vs. time data, recorded by the instrument which is curve-fit with a spline. The first derivative of this curve is then plotted vs. time. The value of the first derivative (slope of the pressure vs. time) converges onto a value which will provide the evaluation.

A fourth aspect of this invention is the ability to average the results over many tubes by enclosing the tubes in a single test chamber. By testing several tubes in one chamber, the average value can be quickly determined using a minimum of hardware. Such measurements would be useful for process control applications where the average of many tubes are routinely measured. Rather than placing one tube in the sample chamber, an array of tubes is placed in the test chamber of this apparatus. The instrument response then reports the total transport into all tubes being tested. The average value can then be calculated for many tubes using a single apparatus, reducing the expense and labor associated with making multiple measurements.

Figure 8:
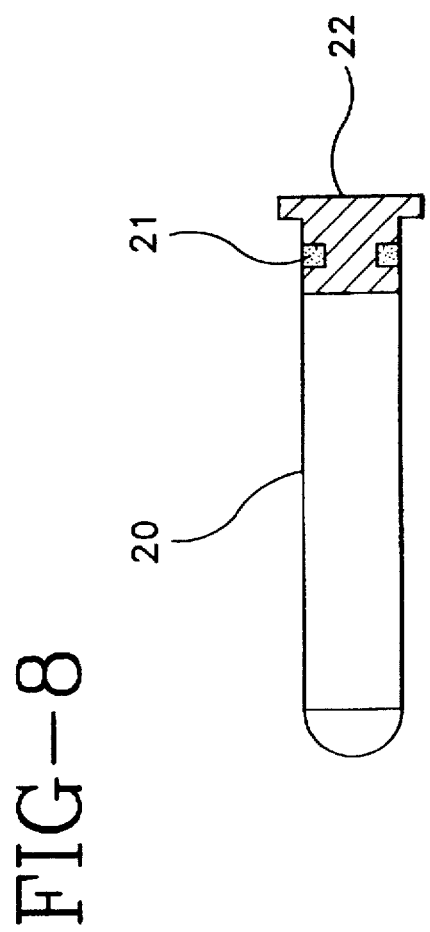
FIG. 8 is a schematic representation of a tube utilized in an embodiment of the invention.

A fifth aspect of this invention is the ability to isolate the tube barrier properties from the closure system. By testing a tube with a non-conducting closure, such as an aluminum stopper with O-ring seals, only the contribution of the tube and barrier system will be measured. If, rather than sealing the mouth of an evacuated blood collection tube with an elastomeric stopper, an impermeable plug was placed in the mouth, such as in FIG. 8., then all leakage would be attributable to the tube 20. The tube 20 has an O-ring seal 21 and an aluminum closure 22. This leakage is not possible with a conventional measurement scheme that requires a cannula puncture in the closure to make the measurement.

EXAMPLE I

The following experiment demonstrates the physical principle upon which all subsequent measurements will be based.

Figure 2:
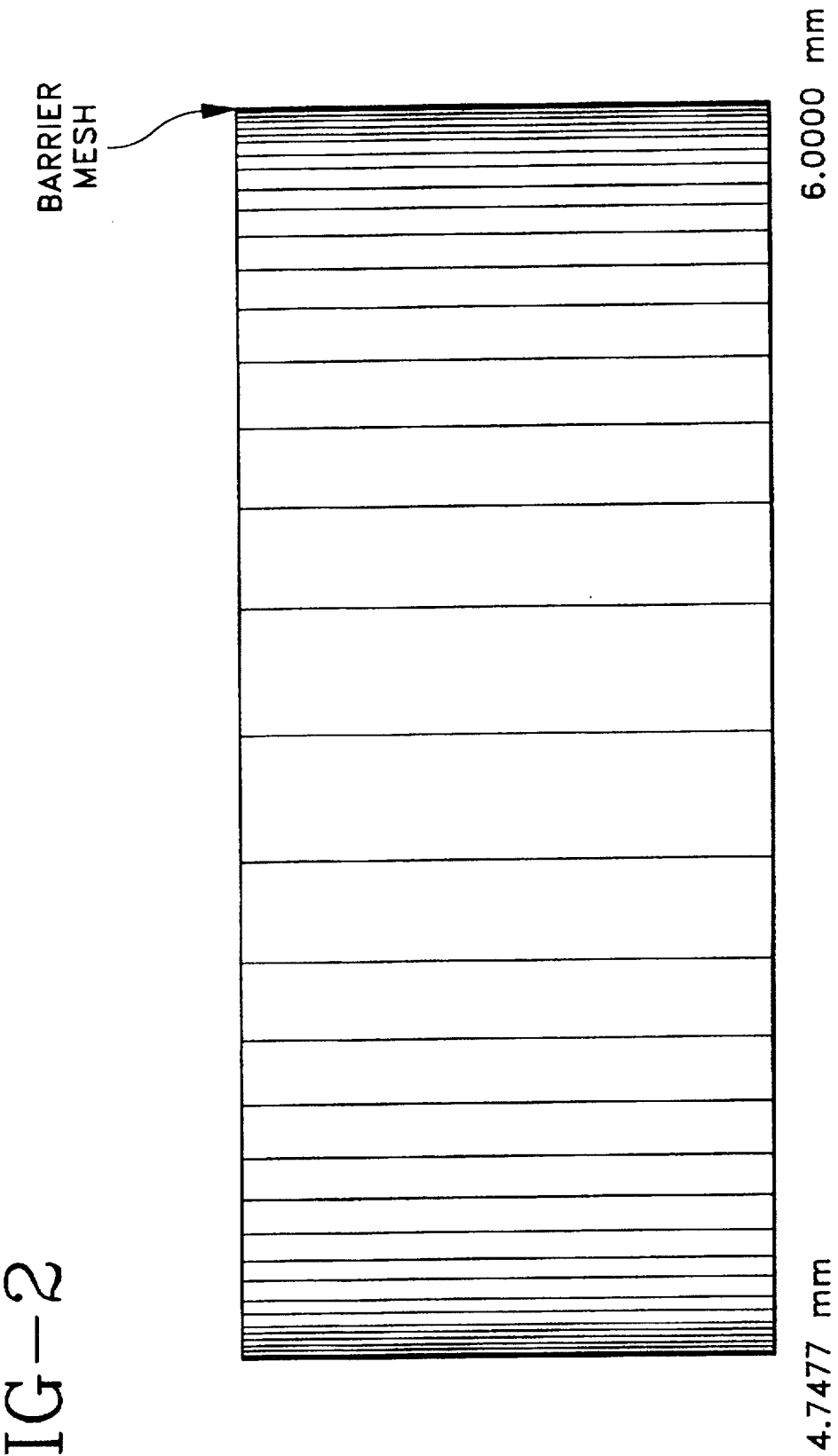
FIG. 2 illustrates the geometric discretization of the tube wall used for numerical modeling purposes.

A numerical representation of a polyethylene terephthalate (PET) blood collection tube was created. This model included a 0.5 mm tall ring of tube wall with a barrier coating on the exterior surface. The barrier for this numerical model is a material that exhibits the transport characteristics of a thin film barrier coating of any type. The 8-noded elements were highly biased toward the free surfaces to accommodate the high transient gradients expected. In the first experiment, a non-barrier tube was subjected to an equilibration step to precondition the tube at ambient conditions. When modeling, an initial definition of the state of all components in a system must be made. This is the equilibration step. Here, the tube is subjected to room temperature and pressure until it is in equilibrium with the surrounding gas (Oxygen for these simulations), representing any tubes taken off the shelf. Thus, the diffusion of oxygen was calculated until a steady state condition was attained. In the following step, the boundary condition at the internal surface was set to that of an evacuated tube. The external boundary condition was set to a three atmosphere pressure of oxygen. This step change in conditions was simulated through to a steady state result. In numerical simulations, in regions of large response, such as the interior and exterior surface of the simulated tube, a very small mesh size is used. In regions of small response, a relatively large mesh size is used. This biasing of the mesh allows for an accurate solution over the entire computational domain without paying a large penalty for the refined mesh, as would be incurred if a fine mesh were used over the entire model. An illustration of the biased mesh is shown in FIG. 2.

Figure 3:
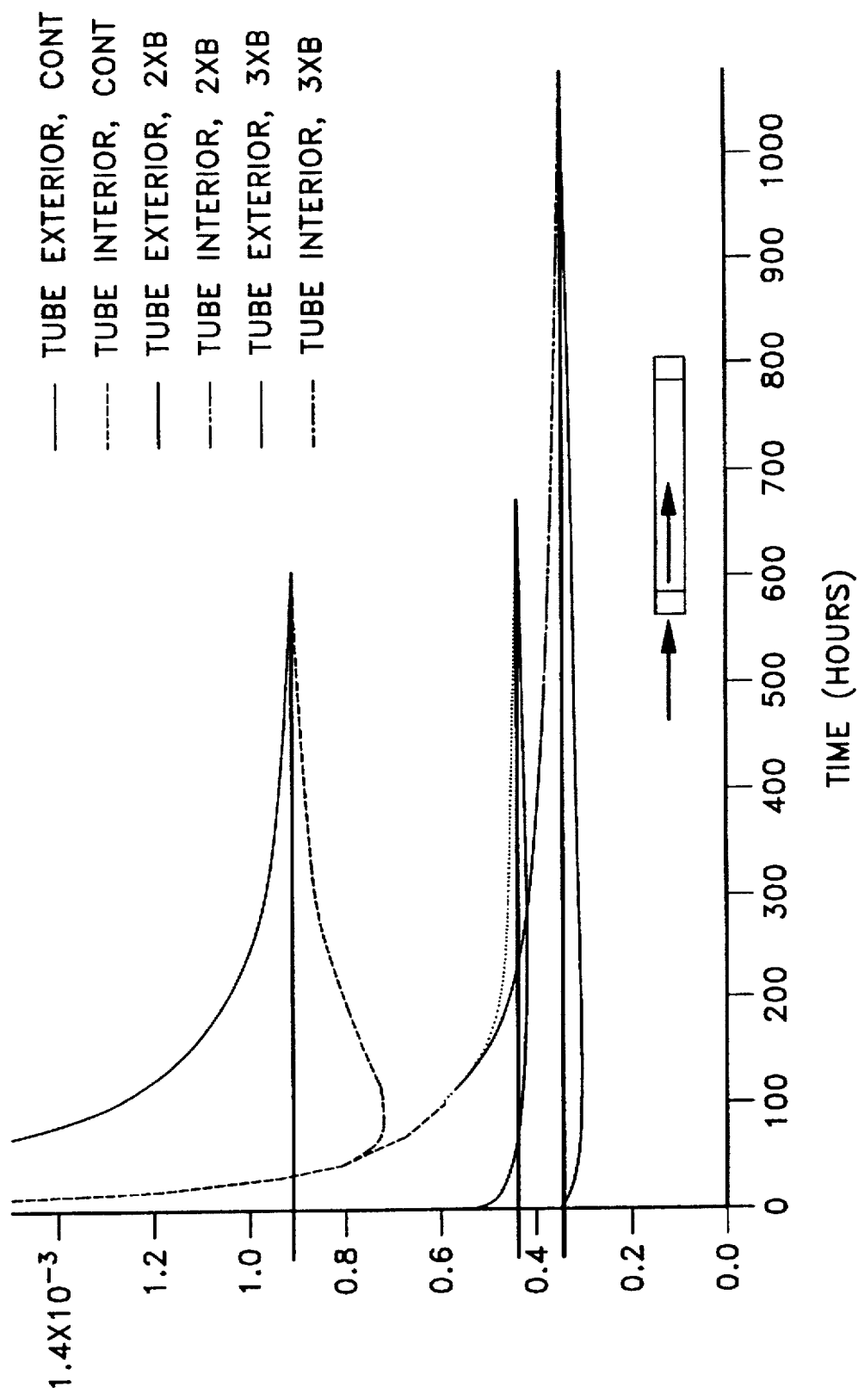
FIG. 3 is a graph showing the change in flux of a coated tube interior or exterior over time.

For a second and third experiment, a barrier tube with roughly two times and with roughly three times the oxygen barrier respectively were subjected to exactly the same environmental conditions. The results of all three numerical experiments are represented in FIG. 3. The term "Cont" in FIG. 3 refers to "Control" as in Control tube, a non-barrier coated PET blood collection tube. The different dashed lines for each of these tubes illustrate mass transport on the interior surface of each tube, simulating the conventional measurement method. From these results it was found that, prior to 50 hr, all three tubes respond identically to each other using conventional test methods. Put another way, looking at the first 50 hours of data, one cannot make any inference as to the quality of the barrier coating on the exterior of the tube, or even if there is a barrier coating on the tube. Furthermore, as the barrier improves, the distinction between two tubes becomes increasingly difficult, i.e., the distinction between any two barrier tubes becomes smaller as the barrier on each tube increases.

In FIG. 3, the solid lines represent the results of the simulation for transport into the tube exterior for each of the three tubes. Here we can conclude that the non-barrier tubes again take hundreds of hours to converge on a steady state result. However, the results from the barrier tubes converge to within 20% of the steady state values within hours, i.e., within 1 to 24 hours. These results do not include effects of the stopper.

Thus, the numerical simulation of transport during an experiment shows that the majority of the transient response of a barrier tube takes place one order of magnitude quicker than the transient response of a non-barrier tube under the same conditions.

EXAMPLE II

The following experiment demonstrates that the predicted acceleration in measurements can be measured on an interior coated barrier tube using a pressure transducer to record pressure over a time period.

Figure 4:
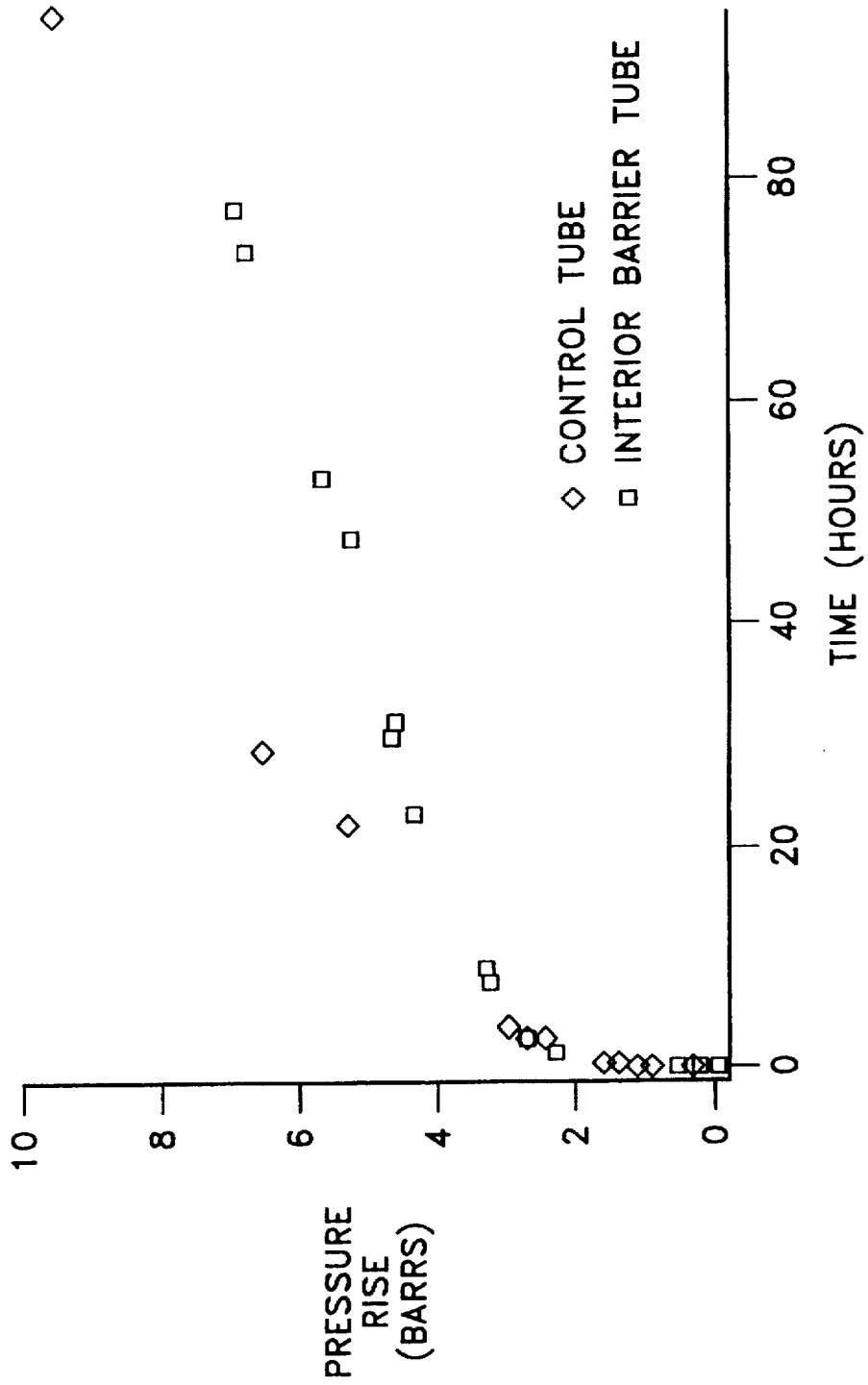
FIG. 4 is a graph showing a comparison of the internal pressure rise over time in a control tube and an internally coated tube.

For this experiment, a PET non-barrier tube was evacuated and sealed with a conventional red closure. The septum of the closure was penetrated by a cannula fitted to an absolute pressure transducer to provide a continuous measurement of the internal pressure of the tube. The pressure was manually recorded as a function of time. The same test was also run with an internally coated barrier tube of unknown barrier quality. The results of both tests are reported in FIG. 4. From this graphical display, it was concluded that the internal barrier tubes can be distinguished from the control tube within 20 hours of the commencement of testing as predicted by the numerical simulation of Example I.

EXAMPLE III

The following experiment demonstrates the utilization of the apparatus set forth in the present invention with a conventional non-barrier PET blood collection tube measured by the apparatus on the exterior of the tube.

The apparatus was constructed to perform this measurement. A schematic representation of this apparatus is shown in FIG. 1. FIG. 1 illustrates the apparatus having an absolute pressure transducer, a differential pressure transducer, two valves, and a minimum of tubing and connection fittings. All connections were made up using Cajon VCR ultra low leak fittings. The apparatus also has a test chamber, conformal to a PET blood collection tube fitted with stopper; also using VCR ultra low leak fittings at all unions. The apparatus system was leak tested with soap solution and subsequently by long duration pressure measurements to insure a leak free system before introducing a test specimen.

Figure 5:
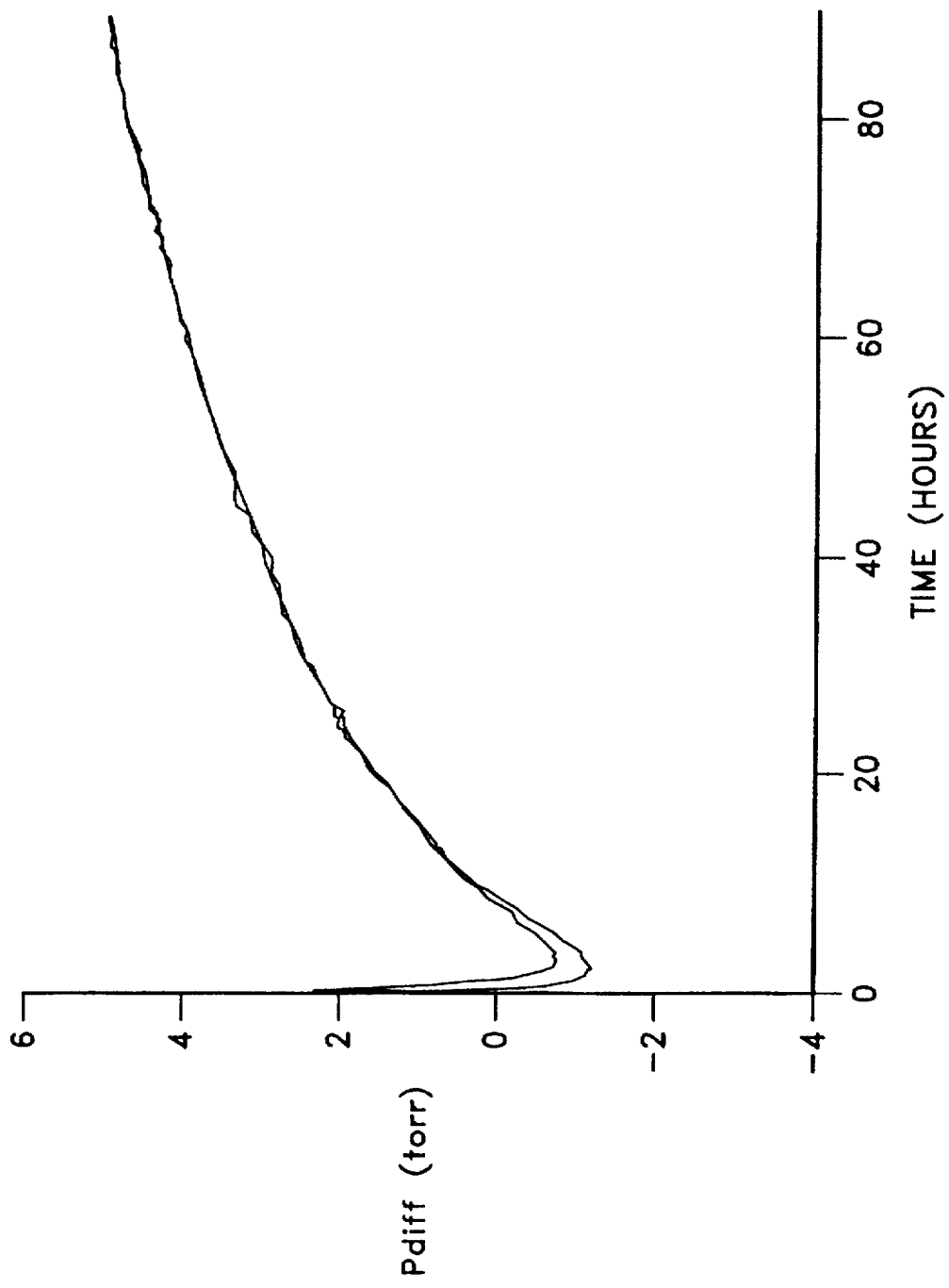
FIG. 5 is a graph showing the pressure differential over time for two different tubes tested in the apparatus of FIG. 1.

To perform the test, a PET blood collection tube and a lubricated red conventional stopper were equilibrated in a 25° C., 50% Relative Humidity room for 1 week. The tube was then evacuated to 50 torr absolute and the closure inserted using standard procedures. The freshly evacuated tube was sealed in the test chamber of the apparatus. The pressure in the test chamber was then raised to 2250 torr (roughly 3 atmospheres pressure) and valve one was sealed. Valve two was then sealed, isolating the test specimen (the tube) from the reference volume. The pressure difference between the two chambers was then monitored with results being recorded at regular intervals. Results were recorded at a rate of 20 samples per hour using a computer data acquisition system. FIG. 5 graphically displays this data for two different tubes tested at identical conditions. These are two seemingly identical tubes. Any discrepancy in the measurement shows a level of irreproducibility. In this case, after 10 hours, the curves are virtually identical, a very good sign.

The results show that, other than the initial short term transient, the system behaves as predicted in the numerical experiment and is repeatable. Additionally, the results are consistent with those in the experiment of Example II.

EXAMPLE IV

This example illustrates the contribution of the closure to the response of the previous experiment. This example also defines the lower limit of mass transfer for a perfect barrier tube using the conventional closure system.

Figure 6:
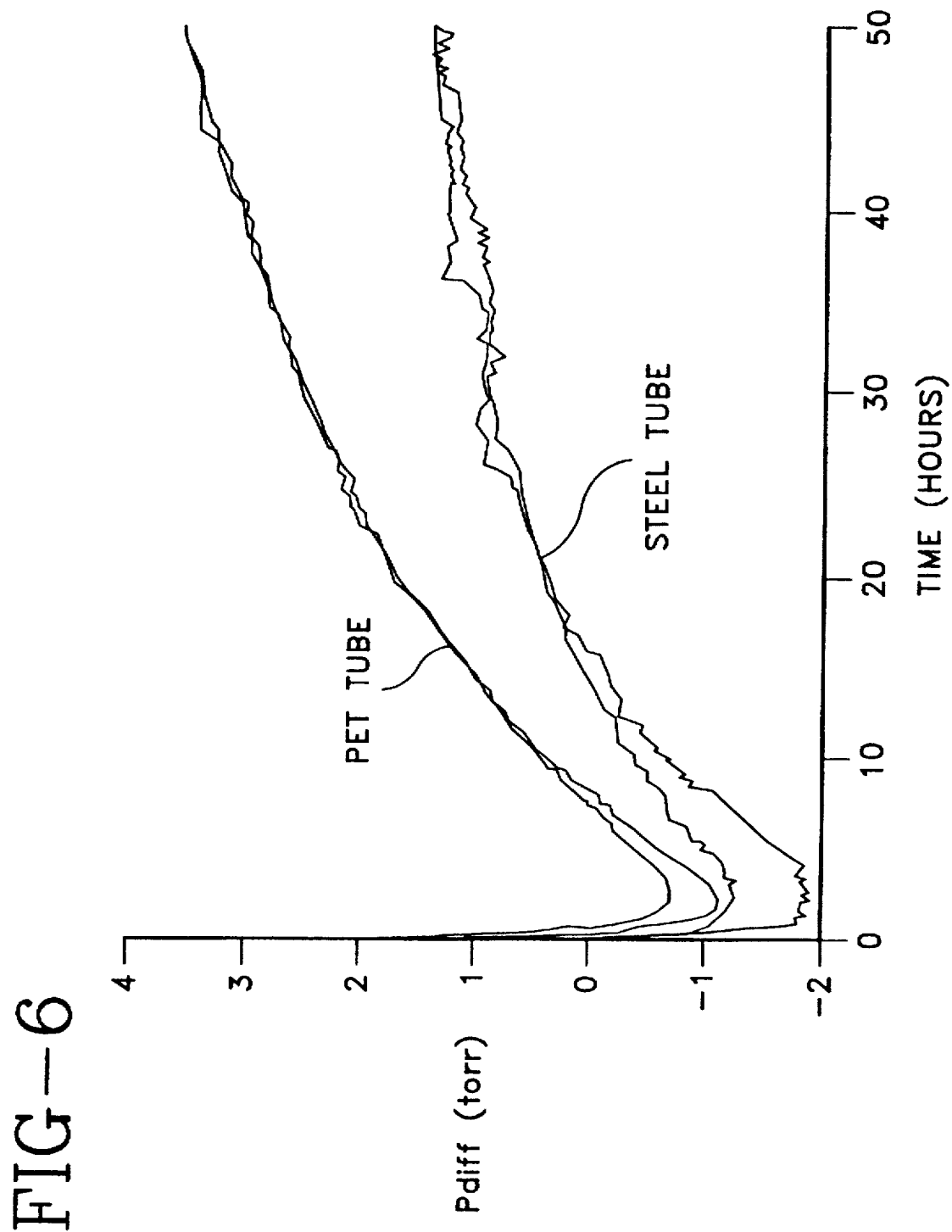
FIG. 6 is a graph showing the pressure differential over time of a stainless steel tube, and the comparison of these results with the results from FIG. 5 which utilized a PET tube.

The experiment is performed exactly as the experiment of Example III except the test article is a stainless steel tube of identical dimension to a PET blood collection tube, evacuated and sealed with the same style closure as above. The results are reported graphically in FIG. 6. In addition, the results from the non barrier PET tube of Example III are shown to compare these results with those from the steel tube.

The results show that this experiment is repeatable and further, that the results from the steel tube are significantly different from the PET control tube. The slope of the pressure vs. Time curve represent the leak rate of the tube. By dividing the terminal slope of the two curves, an estimation that the shelf life of the steel tube would be 3.5 times longer than the PET tube is obtained. This estimation is made in 2 days, rather than the 45 days required by conventional test methods.

EXAMPLE V

Figure 7:
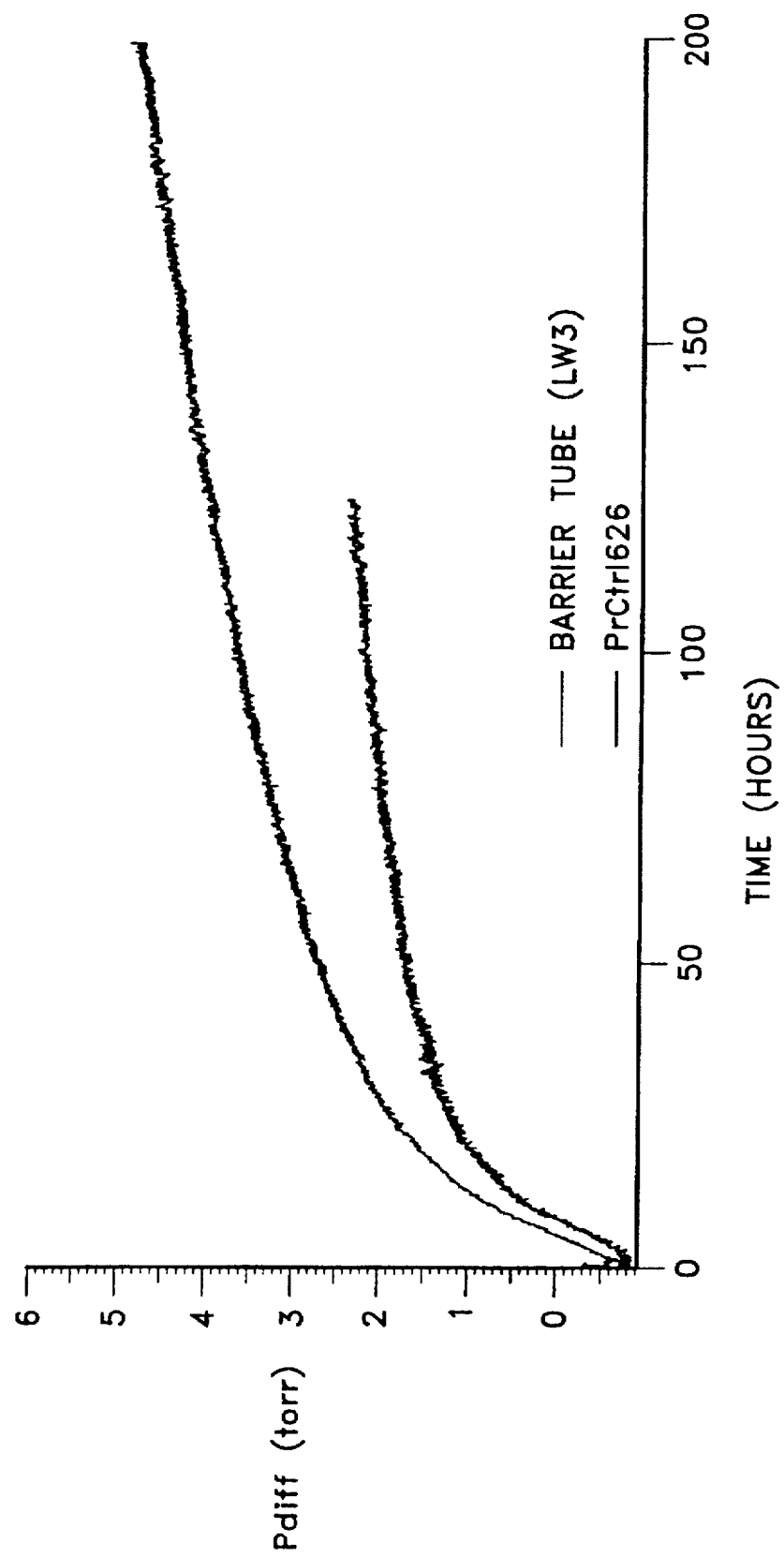
FIG. 7 is a graph showing the pressure differential over time for a tube of unknown barrier in the apparatus of FIG. 1.

A barrier tube of unknown barrier was tested in the same apparatus as utilized in the above Examples III and IV. Identical experimental procedures were used. The results, represented in FIG. 7 again indicate that the tube leakage rate falls below the values of a PET blood collection tube. Secondly, while the control tube measurement takes roughly 250 hours to converge on a final result, the barrier tube converges on a final result in 80 hours. This is in contrast to a minimum of 45 days for a conventional tube leak rate evaluation using a conventional method.

What is claimed is:

1. A method for rapidly estimating the shelf life of evacuated blood collection tubes, comprising:

a) providing an apparatus having a first and second sealable chamber;

a first and second valve;

a differential pressure transducer;

and a gas supply.

wherein said first chamber is interconnected with said second chamber by said first valve, and wherein said second valve is connected to said gas supply and wherein said first chamber can contain at least one tube;

b) placing at least one evacuated blood collection tube in the first sealable chamber;

c) pressuring the apparatus to a value above ambient pressure;

d) sealing the first valve and the second valve such that the first and second chambers are at almost identical pressures isolated from one another;

e) detecting any leakage of gas into the blood collection tube in the first chamber as a differential pressure change relative to the second chamber;

f) recording the rate of change of this pressure as directly proportional to the rate of gas transport into the blood collection tube; and g) quantifying the gas transport in 2 to 10 days.

2. The method of claim 1 wherein said method estimates the shelf life of said tubes in 2 to 10 days.

3. The method of claim 1 wherein said first chamber can contain one to ten tubes.

4. The method of claim 1 wherein said tube placed in said first chamber is a barrier coated tube.

5. The method of claim 1 wherein said tube placed in said first chamber is a a non-barrier coated tube.

6. The method of claim 4 wherein said tube has a lubricated red stopper.

7. The method of claim 4 wherein said tube has a non-conducting closure.

8. The method of claim 7 wherein said non-conducting closure is an aluminum stopper with O-ring seals.

9. The method of claim 5 wherein said tube has a lubricated red stopper.

10. The method of claim 5 wherein said tube has a non-conducting closure .

11. The method of claim 2 wherein the results of the tubes are averaged in order to rapidly obtain an average value for shelf life.

* * * * *